(12) United States Patent
Salameh

(10) Patent No.: US 7,458,586 B2
(45) Date of Patent: Dec. 2, 2008

(54) STATIC SEALING ELEMENT FOR ACOUSTICALLY DECOUPLED ADD-ON PIECES

(75) Inventor: Ralf Salameh, Gondelsheim (DE)

(73) Assignee: Federal-Mogul Sealing Systems Bretten GmbH & Co. KG, Bretten (DE)

( * ) Notice: Subject to any disclaimer, the term of this patent is extended or adjusted under 35 U.S.C. 154(b) by 353 days.

(21) Appl. No.: 10/501,817

(22) PCT Filed: Feb. 7, 2003

(86) PCT No.: PCT/DE03/00350

§ 371 (c)(1),
(2), (4) Date: Jan. 27, 2005

(87) PCT Pub. No.: WO03/072920

PCT Pub. Date: Sep. 4, 2003

(65) Prior Publication Data

US 2006/0202430 A1    Sep. 14, 2006

(30) Foreign Application Priority Data

Feb. 26, 2002   (DE) ............................... 102 08 233

(51) Int. Cl.
*F02F 11/00* (2006.01)
*F16J 15/16* (2006.01)
*F02B 77/00* (2006.01)

(52) U.S. Cl. ........................ 277/591; 277/551; 277/554; 123/198 E

(58) Field of Classification Search ............. 123/195 C, 123/196 R, 90.38, 41.14, 195, 198 E; 141/338; 277/591, 503, 551, 572, 553, 554
See application file for complete search history.

(56) References Cited

U.S. PATENT DOCUMENTS

| 1,764,701 | A |   | 6/1930 | Spreen |
|-----------|---|---|--------|--------|
| 4,021,049 | A | * | 5/1977 | Phelps et al. ................ 277/551 |
| 4,274,641 | A | * | 6/1981 | Cather, Jr. ................... 277/309 |
| 4,449,717 | A | * | 5/1984 | Kitawaki et al. ............. 277/568 |

(Continued)

FOREIGN PATENT DOCUMENTS

DE    1 902 491    11/1970

(Continued)

*Primary Examiner*—Stephen K. Cronin
*Assistant Examiner*—Ka Chun Leung
(74) *Attorney, Agent, or Firm*—Robert L. Stearns; Dickinson Wright PLLC

(57) ABSTRACT

The invention relates to a housing sealing cover (1, 10, 15, 18) for detachable liquid-tight fixing to an internal combustion engine, comprising an add-on piece (24) which is firmly connected to the housing, extending through the cover when in a mounted position. Said cover consists of a metallic or polymer support element (2) made of a single layer and is provided with an opening (25) for the add-on piece (24), wherein a seal (23) is arranged in said opening. Said seal comprises a sealing lip (3, 11) extending axially on the edge (26) of the opening (25) and a sealing lip (5, 12, 16, 19) extending radially in relation to the seal of the add-on piece (24). The radially extending sealing lip (5, 12, 16, 19) is retained in the opening (25) in an angularly and radially displaceable manner with respect to the support element (2).

9 Claims, 1 Drawing Sheet

U.S. PATENT DOCUMENTS

| | | | | |
|---|---|---|---|---|
| 4,588,195 | A * | 5/1986 | Antonini et al. | 277/504 |
| 4,844,484 | A * | 7/1989 | Antonini et al. | 277/561 |
| 6,267,875 | B1 * | 7/2001 | Leo | 210/90 |
| 6,348,149 | B1 * | 2/2002 | Jenkins | 210/172.3 |
| 6,527,276 | B1 * | 3/2003 | Phillips et al. | 277/551 |
| 6,601,740 | B1 * | 8/2003 | Clive | 222/484 |
| 2003/0051753 | A1 * | 3/2003 | Stevens | 137/205 |
| 2003/0061875 | A1 * | 4/2003 | Dougherty et al. | 73/290 R |
| 2003/0183662 | A1 * | 10/2003 | Ingram | 222/548 |
| 2005/0087161 | A1 * | 4/2005 | Lu | 123/90.38 |
| 2006/0185763 | A1 * | 8/2006 | Rosenbaum | 141/338 |
| 2007/0000572 | A1 * | 1/2007 | Kellogg | 141/329 |

FOREIGN PATENT DOCUMENTS

| | | |
|---|---|---|
| DE | 29 22 030 | 12/1979 |
| DE | 3003463 C2 | 8/1987 |

* cited by examiner

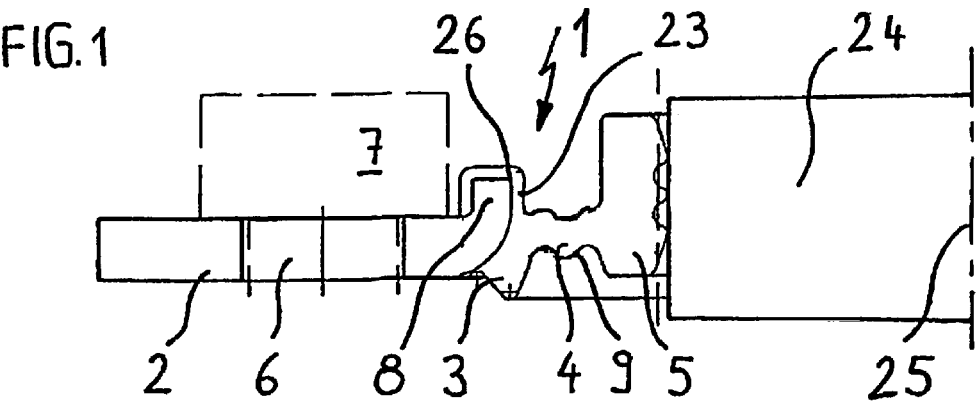
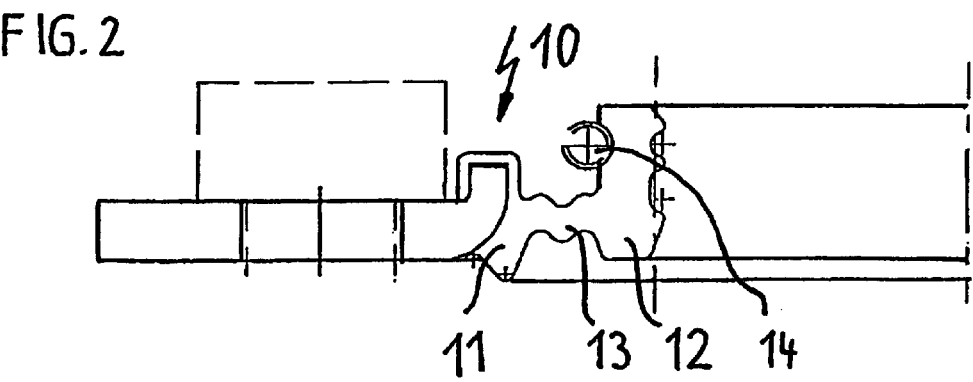
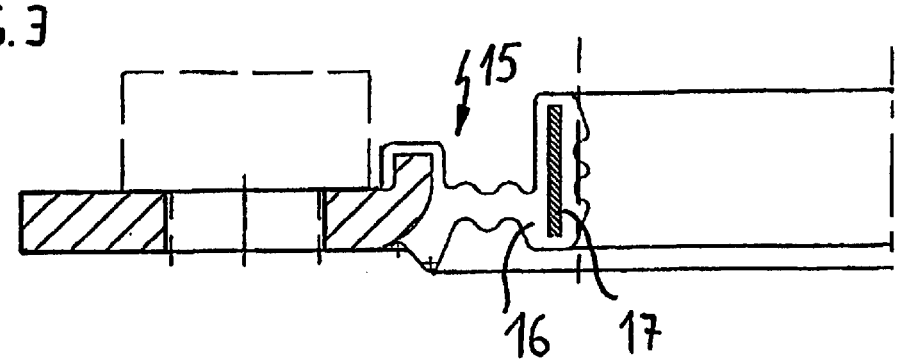
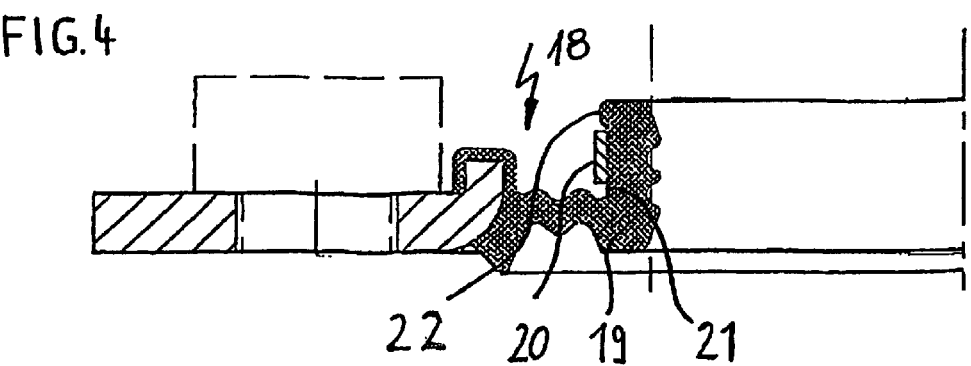

STATIC SEALING ELEMENT FOR ACOUSTICALLY DECOUPLED ADD-ON PIECES

BACKGROUND OF THE INVENTION

1 Technical Field

The invention describes a housing closing cover for a detachable fluid-tight fixture on a combustion engine.

2 Related Art

The increasing number of electronic components in and around engines requires an ever increasing number of solutions for fluid-tight implementations for add-on parts, such as sensors, plugs, cables, etc. This applies especially to add-on parts such as speed and position sensors in the timing mechanism that will pass the information from the interior engine to external analyzing units. For this purpose the add-on parts, such as the sensors, must be fed outwards through the housing closing cover. A series of housing closing covers are known to ensure the tightness of this implementation.

From the EP 0 528 104 B1 a housing closing cover with a built-in shaft spanning the cover, which consists of a tread drawn sheet-metal cover that has predominantly a cup shaped profile. Its floor surface has two offset radially arranged radial surfaces, where bolt through-holes are arranged on the first radial surface for connecting the housing to be tightened. The second radial surface is cascaded and displaced against it in order to work as a receiver of a statically acting side seal and as a dynamic lip-seal for the shaft.

Thus, the housing closing cover has two independently acting seals that will seal, firstly, the housing closing cover statically against the engine and, secondly, dynamically against the shaft. The stiff connection between the static and dynamic seal using the sheet-metal cover will have a negative effect on the possible angular offset of the shaft. Another disadvantage is that the dynamic seal can only follow a radial movement of the shaft under certain conditions.

In order to follow an angular offset of add-on parts on the engines in GB 562,456 a shaft seal is revealed in which the flexible connection between the static connection to the engine and the dynamic shaft seal are provided. The shaft seal consists of elastomer rings with a metal supporting element and a coaxial corrugated plate-shaped path that is furnished in the shaft area with a radial acting snap ring.

With the help of such seals it is possible to adjust an angular offset of add-on parts, however the assembly of such a shaft seal can be quite work intensive since these must often be pressed in place.

SUMMARY OF THE INVENTION AND ADVANTAGES

The challenge of the invention is to develop an acoustically decoupled, fluid-tight housing closing cover that will guarantee a static seal for the assembly face and the add-on part, and that is able to adjust an angular offset as well as a radial shift of the add-on part.

The idea of this invention solves this challenge in the sense that the housing closing cover is equipped with a built-in add-on part spanning the cover that is tightly connected to the housing and consists of a single-layer metallic or polymer carrier element having a generally planar bottom surface that has an opening for the add-on part. The opening has a seal configured in that has an axial sealing lip spanning the opening edge and extending axially outwardly from the planar bottom surface of the carrier element, as illustrated in FIGS. 1-4, to provide a static face seal between the housing and the mating component, and radially, to tighten the add-on part. This sealing lip spanning radially extends axially inwardly in relation to the planar bottom surface, with a portion of the radial sealing lip being radially aligned with the planar bottom surface, as further illustrated in FIGS. 1-4, and will be held against the carrier element moving angularly and radially in the opening. The tapered formation of the connecting zone will make the connection of the add-on part to the carrier element more flexible. As per the invention this tapering occurs between the axial and the radial sealing lips of the seal, and can be formed as a wave shaped connecting or fusion zone extending coplanar with the planar bottom surface. For this purpose, the tapering of the seal must only be demolded enough to allow the seal to be more easily formed in the fusion zone area then in the area of the axial and radial sealing lips. Thus, the housing closing cover is able to adjust the position tolerances between the add-on part and the engine and also between the bolt connection of the sheet panel and the engine opening.

This shows another advantage: now the housing closing cover can be more easily assembled and disassembled with the flexibly executed fusion zone. Now, the stiff add-on parts will no longer be damaged, especially during the disassembling.

According to the invention, the design of the housing cover has another advantage in that the add-on parts are decoupled acoustically to a greater degree. As a result acoustically decoupled systems often possess a greater stiffness that can negatively influence the decoupling effect. On the other hand the tapering of the fusion zone offers the advantage that there will not be a stiff connection between the axial and radial tightening, so that vibrations cannot be transferred. Furthermore, individual coordination of the partial areas of the axial sealing lip, fusion zone and radial sealing lip can take place.

There is the suggestion in another implementation of this invention of the housing closing cover that the fusion zone of the housing closing cover can be formed in a wavelike manner, so that it has the form of a gaiter seal or several diskspring formed plates, configured one after the other. Here it is also conceivable that the fusion zone can be manufactured using another material than the seal material. This can be a polymer or a metallic material.

In another development of this invention it is also possible to fit the carrier element at the opening area with a bevel. Regarding the way it is lined up, the bevel is configured away from the assembly surface and serves on one hand to stiffen the carrier element and, on the other hand, as a lighter connection and formation of the axial sealing lip.

To enable greater sealing power throughout the entire lifetime of the housing closing cover it is recommended, according to the invention, that a spring ring be configured on the radial exterior peripheral surface of the radial sealing lip of the seal. For this purpose the spring ring will be configured in the area of the extension of the add-on part so that there is another radial force affecting the radial sealing lip and thus the add-on part.

Another way of influencing the sealing power is to include a stiff rotating ring into the radial sealing lip of the seal. This ring can be manufactured using a metallic or high-strength plastic. On one hand this ring can be molded into a radial sealing lip or lie on the radial exterior surface of the radial sealing lip, keeping the ring positively engaged.

THE DRAWINGS

The following describes other implementation examples, according to this invention, of a housing closing cover with axial and radial sealing lip areas and a connection element. Details are given in drawings and below in the description.

FIG. 1 Shows, using an implementation example of this invention, the section of housing closing cover with an axial and radial sealing lip and a tapered fusion zone.

FIG. 2 Shows, using an implementation example of this invention, the section of a housing closing cover with an axial and radial sealing lip and a tapered fusion zone and a spring ring in the radial sealing area FIG. 3 Shows, using an implementation example of this invention, the section of a housing closing cover with an axial and radial sealing lip and a tapered fusion zone and a stiffening ring in the area of the radial sealing lip FIG. 4 Shows, using an implementation example of this invention, the section of a housing closing cover with an axial and radial sealing lip and a tapered fusion zone and a stiffening ring on the radial exterior surface of the radial sealing ring.

DETAILED DESCRIPTION

In FIG. 1 the section is shown using a housing closing cover 1 according to the invention, consisting of a carrier element 2, a seal 23, and axial sealing lip 3, a fusion zone 4, an add-on part 24 and a radial sealing lip 5, whereby the add-on part 24 is kept in the opening 25 of the carrier element 2. For this purpose the carrier element 2 is furnished with a through-hole 6 for an attachment bolt 7 and angled 8 in the aria of the axial sealing lip 3 so that an edge 26 is formed.

The fusion zone 4 between axial 3 and radial 5 sealing lips is molded in a wavelike manner 9 in this example.

In FIG. 2 the section is shown using a housing closing cover 10 with an axial 11 and radial 12 sealing lip, a tapered fusion zone 13 and a spring ring 14 in the area of the radial sealing lip 12.

Another implementation example of the invention is portrayed in figure 3. The housing closing cover 15 is equipped in the radial sealing lip 16 with a stiff ring 17. The ring 17 counteracts the relaxation of the elastomer sealing materials and acts simultaneously as a stiffening element.

In FIG. 4 the section is shown using a housing closing cover 18 that is equipped with a stiff ring 20 in the area of the radial sealing lip 19. The ring is configured on the radial exterior surface 21 of the radial sealing lip 19 and is kept positively engaged 22.

The invention claimed is:

1. A housing closing cover comprising:
a carrier element having a generally planar bottom surface to be positioned in direct abutment against a mating component and having an opening in said carrier element;
a fluid seal mounted in said opening of said carrier element, said seal having a static annular axial sealing lip facing in the axial direction of said opening adjacent an edge of said opening, said axial sealing lip extending axially outwardly from said planar bottom surface of said carrier element to provide a static face seal between said housing and the mating component, and including an annular radial sealing lip attached to said axial sealing lip and extending in a radial direction from said axial sealing lip for sealing a member projecting through said opening, and wherein said radial sealing lip extends axially inwardly in relation to said planar bottom surface and is supported for angular and radial movement relative to said carrier element without significantly impairing the sealing established by said radial sealing lip about the member projecting through the opening.

2. The housing cover of claim 1, wherein said fluid seal includes a fusion zone connecting said radial sealing lip to said axial sealing lip and enabling said angular and radial movement of said radial sealing lip through flexing of said fusion zone.

3. The housing cover of claim 2 wherein said fusion zone is tapered having a wave form.

4. The housing cover of claim 1 including a rigid ring mounted on said sealing lip opposite and annularly about said sealing lip.

5. The housing cover of claim 4 wherein said rigid ring is molded in place in said fluid seal.

6. The housing cover of claim 1 wherein a portion of said radial sealing lip is radially aligned with said planar bottom surface of said carrier element.

7. The housing cover of claim 6 wherein a wave shaped fusion zone extends coplanar with said planar bottom surface of said carrier element to connect said static face seal to said axial sealing lip.

8. The housing cover of claim 1 wherein said carrier element includes an axially angled region adjacent said opening.

9. The housing cover of claim 1 including a flexible retainer spring mounted on said fluid seal opposite and annularly about said radial sealing lip.

* * * * *